(12) United States Patent
Friesen

(10) Patent No.: US 8,491,763 B2
(45) Date of Patent: Jul. 23, 2013

(54) OXYGEN RECOVERY SYSTEM AND METHOD FOR RECOVERING OXYGEN IN AN ELECTROCHEMICAL CELL

(75) Inventor: Cody A. Friesen, Fort Mcdowell, AZ (US)

(73) Assignee: Fluidic, Inc., Scottsdale, AZ (US)

( * ) Notice: Subject to any disclaimer, the term of this patent is extended or adjusted under 35 U.S.C. 154(b) by 908 days.

(21) Appl. No.: 12/549,617

(22) Filed: Aug. 28, 2009

(65) Prior Publication Data

US 2010/0119895 A1 May 13, 2010

Related U.S. Application Data

(60) Provisional application No. 61/136,330, filed on Aug. 28, 2008.

(51) Int. Cl.
*C25B 1/02* (2006.01)

(52) U.S. Cl.
USPC ........................................ 204/275.1; 205/633

(58) Field of Classification Search
USPC ........................................ 204/275.1; 205/633
See application file for complete search history.

(56) References Cited

U.S. PATENT DOCUMENTS

| | | | |
|---|---|---|---|
| 3,219,486 A | 11/1965 | Gumucio | |
| 3,615,843 A | 10/1971 | Moran | |
| 3,650,837 A | 3/1972 | Palmer | |
| 3,713,892 A | 1/1973 | Moran | |
| 3,801,376 A | 4/1974 | Lindstrom | |
| 4,119,772 A | 10/1978 | Peters et al. | |
| 5,104,497 A | 4/1992 | Tetzlaff | |
| 5,318,861 A * | 6/1994 | Harats et al. | 429/404 |
| 5,356,729 A | 10/1994 | Pedicini | |
| 5,376,471 A | 12/1994 | Hunter et al. | |
| 5,560,999 A | 10/1996 | Pedicini | |
| 5,721,064 A | 2/1998 | Pedicini | |
| 5,972,531 A | 10/1999 | Kawakawi | |
| 6,153,328 A * | 11/2000 | Colborn | 429/51 |
| 6,277,508 B1 | 8/2001 | Reiser et al. | |
| 6,383,675 B1 | 5/2002 | Zhong | |
| 6,579,637 B1 | 6/2003 | Savage et al. | |
| 6,811,903 B2 | 11/2004 | Vartak et al. | |
| 6,866,950 B2 | 3/2005 | Connor et al. | |
| 6,902,602 B2 | 6/2005 | Keefer et al. | |
| 7,279,245 B1 | 10/2007 | Clark | |
| 2005/0019651 A1 | 1/2005 | Tsai et al. | |

(Continued)

FOREIGN PATENT DOCUMENTS

JP 2005100967 A * 4/2005

*Primary Examiner* — Nicholas A Smith
(74) *Attorney, Agent, or Firm* — Pillsbury Winthrop Shaw Pittman LLP

(57) ABSTRACT

An oxygen recovery system configured to recover evolved oxygen from a regenerative electrochemical cell. The electrochemical cell includes an oxygen reduction cathode, a fuel electrode configured to be a fuel anode when the cell is operated to generate electricity and a cathode for reducing fuel thereon when the cell is operated to regenerate the fuel, and an oxygen evolution anode that is configured to evolve oxygen from an electrolyte solution when the cell is operated to regenerate the fuel. The oxygen recovery system includes an oxygen separator located downstream of the oxygen evolution anode in a recharge direction of flow. The oxygen separator is configured to separate the evolved oxygen from the electrolyte solution. An oxygen recovery path is disposed between the oxygen separator and the oxygen reduction cathode. The oxygen recovery path is configured to direct the evolved oxygen separated from the electrolyte solution to the oxygen reduction cathode.

27 Claims, 4 Drawing Sheets

U.S. PATENT DOCUMENTS

| | | |
|---|---|---|
| 2005/0123815 A1 | 6/2005 | Tsai et al. |
| 2005/0170245 A1 | 8/2005 | Vartak et al. |
| 2005/0233191 A1 | 10/2005 | Ushio |
| 2007/0141415 A1 | 6/2007 | Yang et al. |
| 2007/0141430 A1 | 6/2007 | Huang et al. |
| 2007/0141432 A1 | 6/2007 | Wang et al. |
| 2007/0234900 A1 | 10/2007 | Soloveichik et al. |
| 2007/0269695 A1 | 11/2007 | Yamazaki et al. |
| 2008/0145719 A1 | 6/2008 | Yang et al. |
| 2008/0145721 A1 | 6/2008 | Shapiro et al. |
| 2008/0145737 A1 | 6/2008 | Cai et al. |
| 2009/0092882 A1 * | 4/2009 | Kjeang et al. .................. 429/34 |

* cited by examiner

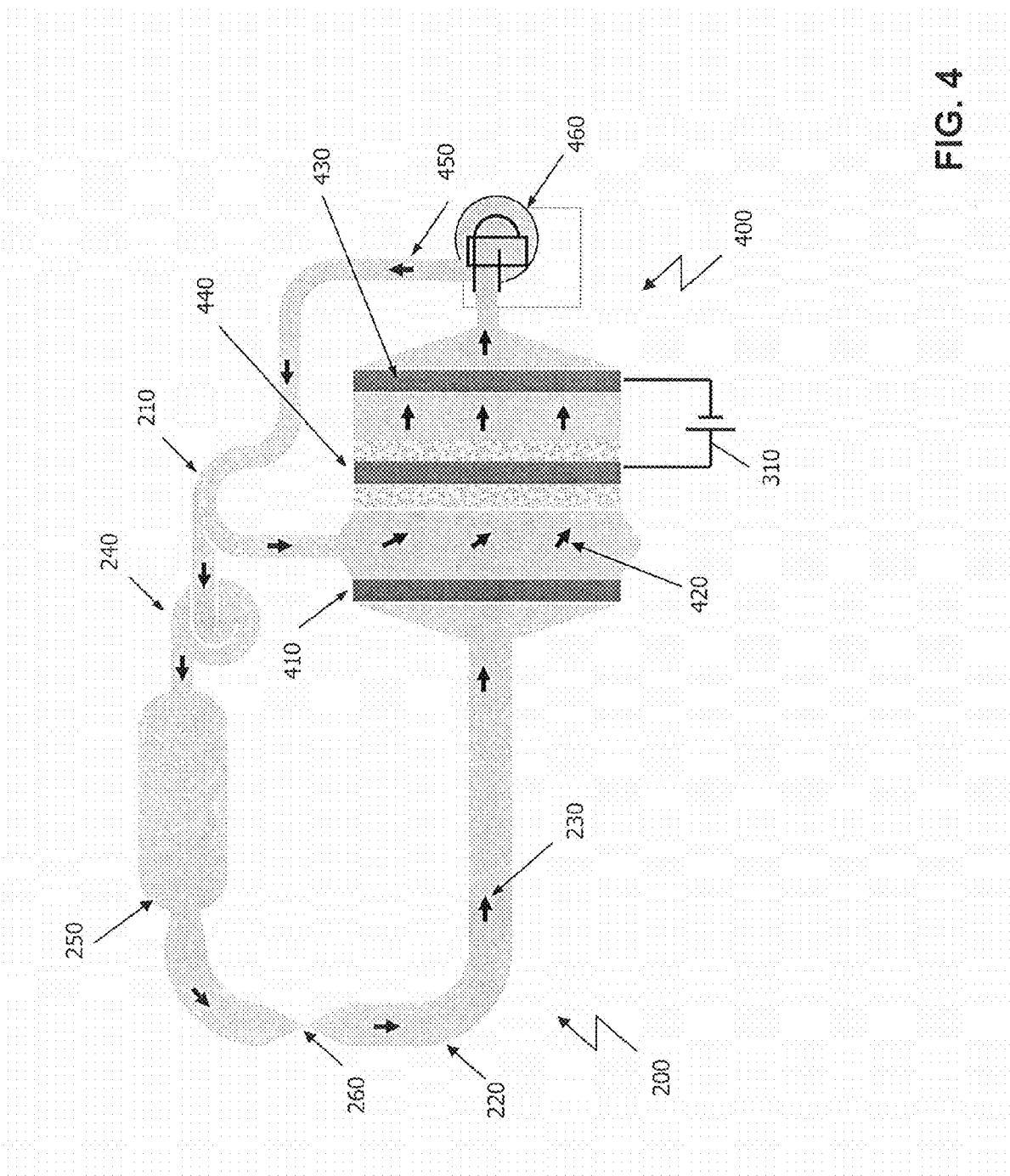

OXYGEN RECOVERY SYSTEM AND METHOD FOR RECOVERING OXYGEN IN AN ELECTROCHEMICAL CELL

CROSS-REFERENCE TO RELATED APPLICATIONS

The present application claims the benefit of priority from U.S. Provisional Patent Application No. 61/136,330, filed on Aug. 28, 2008, the content of which is incorporated herein by reference in its entirety.

FIELD

The present application relates to an oxygen recovery system for an electrochemical cell, and a method for recovering oxygen in an electrochemical cell

BACKGROUND

Regenerative metal-air electrochemical cells operate through the oxidation and reduction of a metal fuel. In some metal-air cells, such as that disclosed in U.S. Provisional Patent Application No. 61/054,364, filed on May 19, 2008, and U.S. patent application Ser. No. 12/385,489, filed on Apr. 9, 2009, the contents of both of which are incorporated herein by reference in their entireties, the initial discharge of the electrochemical cell occurs through the oxidation of a metal to a metal oxide on an electrode acting as a fuel anode, while an air cathode reduces an oxidizer, such as oxygen to hydroxide, in the flowing electrolyte solution. As the metal fuel is increasingly oxidized, the capacity of the cell to discharge energy to an external load is progressively reduced. By utilizing a third electrode as an oxygen evolution anode, and utilizing the depleted fuel anode as a plating cathode, the application of a power source can recharge the cell by reducing an oxidized form of the metal to metal fuel, and evolving oxygen.

Oxygen evolved during recharge of such electrochemical cells typically gasses out of the electrolyte and is discarded to the atmosphere. In such electrochemical cells, the virtually limitless supply of oxygen in the air ensures that the air cathode will constantly have a source of oxygen needed for the reduction of oxygen to hydroxide during discharge. One potential drawback of using air as a source of oxygen is that generally less than 21 percent of dry ambient air is composed of the oxygen used by the electrochemical cell. The other gasses present in air do not further the electrochemical reactions in the cell, and may detract from the operation of the cell over time. For example, carbon dioxide, which constitutes approximately 0.04 percent of dry air, may react adversely in the electrochemical cell to create carbonate on the air cathode. The gradual buildup of carbonate may increasingly degrade the efficiency of the electrochemical cell, thereby limiting the cell's effective lifespan. While continuously supplying pure oxygen from an external source to the air cathode during its operation would eliminate the adverse effects stemming from the presence of gasses other than oxygen in ambient air, such a supply may increase both the size and cost of the cell, making such cells inappropriate for a multitude of uses.

The present invention endeavors to provide various improvements over regenerative electrochemical cells utilizing an air cathode.

SUMMARY

According to an aspect of the present invention, there is provided an oxygen recovery system configured to recover evolved oxygen from a regenerative electrochemical cell. The regenerative electrochemical cell includes an oxygen reduction cathode, and a fuel electrode configured to be a fuel anode when the electrochemical cell is operated to generate electricity and a cathode for reducing fuel thereon when the electrochemical cell is operated to regenerate the fuel. The cell also includes an oxygen evolution anode that is configured to evolve oxygen from an electrolyte solution when the electrochemical cell is operated to regenerate the fuel. The oxygen recovery system includes an oxygen separator located downstream of the oxygen evolution anode in a recharge direction of flow. The oxygen separator is configured to separate the evolved oxygen from the electrolyte solution. The oxygen recovery system also includes an oxygen recovery path disposed between the oxygen separator and the oxygen reduction cathode. The oxygen recovery path is configured to direct the evolved oxygen separated from the electrolyte solution to the oxygen reduction cathode.

According to another aspect of the present invention, there is provided a method for recovering evolved oxygen from a regenerative electrochemical cell. The regenerative electrochemical cell is configured to operate through oxidation of a metal fuel and reduction of an oxidizer. The cell includes an oxygen reduction cathode, a fuel electrode configured to be a fuel anode when the electrochemical cell is operating to generate electricity and a cathode when the electrochemical cell is operating to regenerate the fuel, and an oxygen evolution anode that is configured to evolve oxygen from an electrolyte solution when the electrochemical cell is operating to regenerate the fuel. The method includes recharging the regenerative electrochemical cell by reducing reducible metal fuel ions from the electrolyte solution into the metal fuel onto the fuel electrode functioning as a cathode and the evolving oxygen via oxidation at the oxygen evolution anode, separating the evolved oxygen from the electrolyte solution with an oxygen separator, and directing the evolved oxygen from the oxygen separator into an oxygen recovery path disposed between the oxygen separator and the oxygen reduction cathode.

According to an aspect of the present invention, there is provided an electrochemical cell system that includes a regenerative electrochemical cell and an oxygen recovery system. The regenerative electrochemical cell includes an oxygen reduction cathode, and a fuel electrode configured to be a fuel anode when the electrochemical cell is operated to generate electricity and a cathode for reducing fuel thereon when the electrochemical cell is operated to regenerate the fuel. The cell also includes an oxygen evolution anode that is configured to evolve oxygen from an electrolyte solution when the electrochemical cell is operated to regenerate the fuel. The oxygen recovery system is configured to recover evolved oxygen from the regenerative electrochemical cell. The oxygen recovery system includes an oxygen separator located downstream of the oxygen evolution anode in a recharge direction of flow. The oxygen separator is configured to separate the evolved oxygen from the electrolyte solution. The oxygen recovery system also includes an oxygen recovery path disposed between the oxygen separator and the oxygen reduction cathode. The oxygen recovery path is configured to direct the evolved oxygen separated from the electrolyte solution to the oxygen reduction cathode.

Other aspects of the present invention will become apparent from the following detailed description, the accompanying drawings, and the appended claims.

BRIEF DESCRIPTION OF THE DRAWINGS

FIG. 4 is a schematic view of the regenerative electrochemical cell and evolved oxygen recovery system of FIG. 3, when the regenerative electrochemical cell is configured to recharge a fuel electrode of the electrochemical cell.

DETAILED DESCRIPTION

Figure 1:
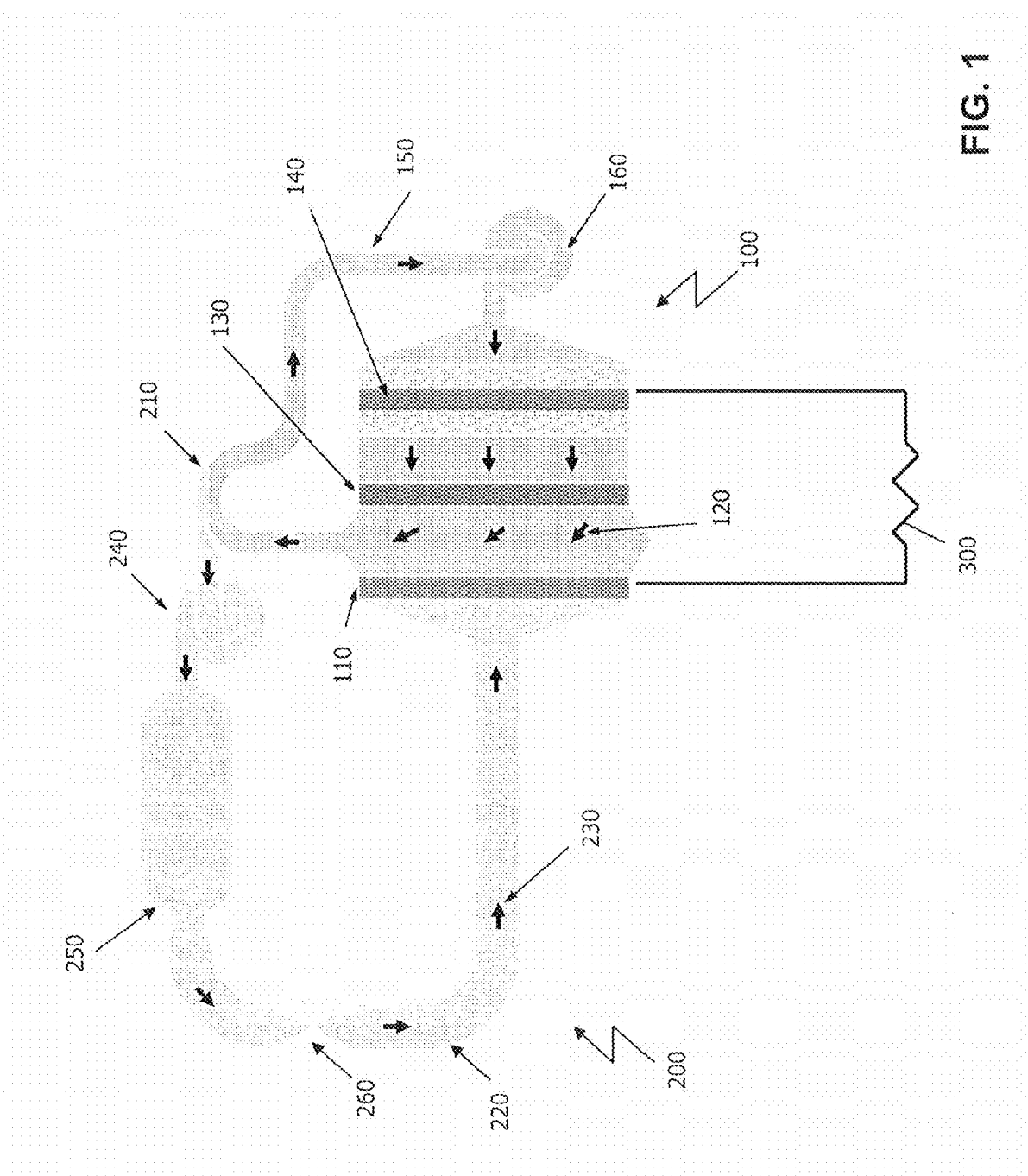
FIG. 1 is a schematic view of an embodiment of a regenerative electrochemical cell with an embodiment of an evolved oxygen recovery system according to the present invention, when the regenerative electrochemical cell is configured to discharge electricity.
Figure 2:
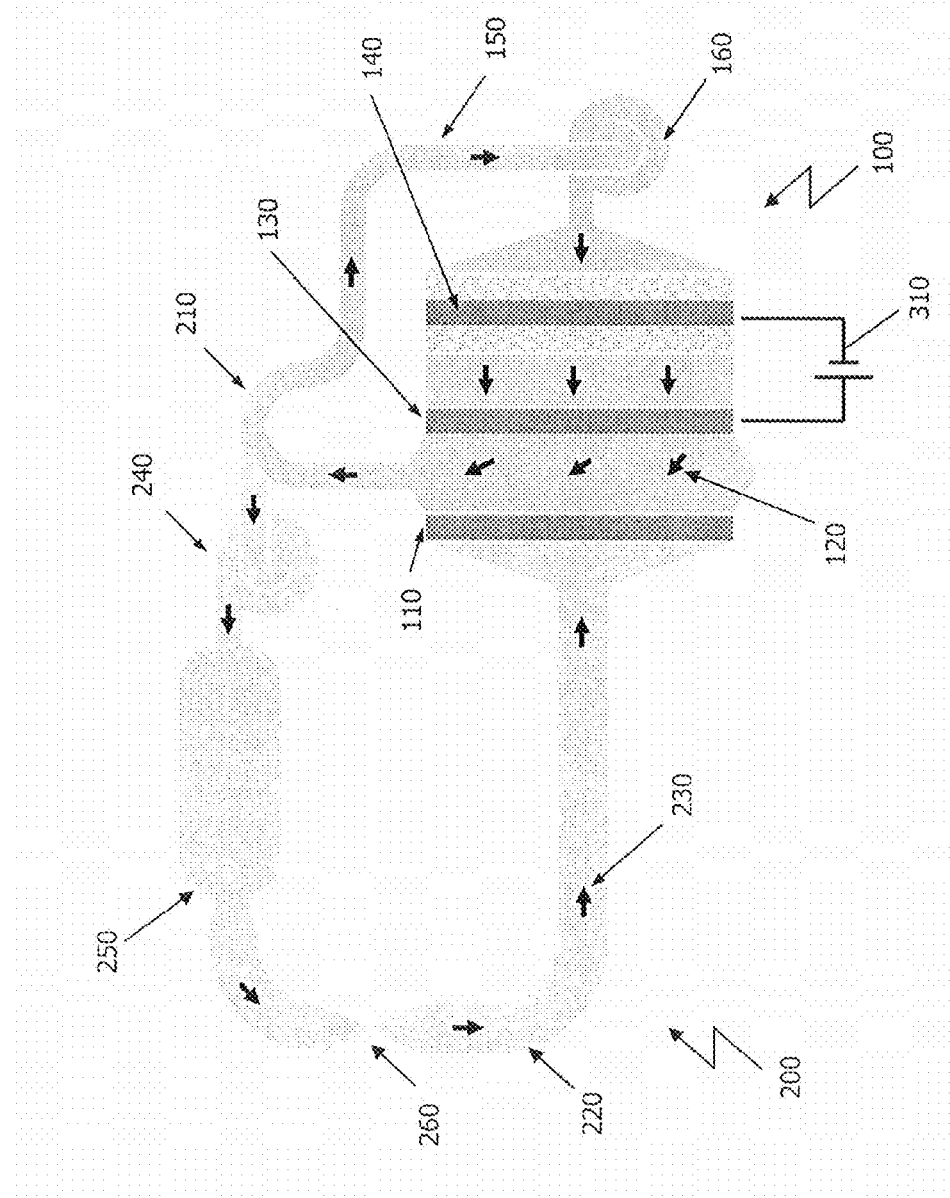
FIG. 2 is a schematic view of the regenerative electrochemical cell and evolved oxygen recovery system of FIG. 1, when the regenerative electrochemical cell is configured to recharge a fuel electrode of the electrochemical cell.

FIG. 1 and FIG. 2 show schematic views of an embodiment of a single flow regenerative electrochemical cell 100 with an evolved oxygen recovery system 200. The regenerative electrochemical cell 100 may have the same or substantially similar configuration as the electrochemical cell described in U.S. Provisional Patent Application No. 61/054,364, filed on May 19, 2008, and U.S. patent application Ser. No. 12/385,489, filed on Apr. 9, 2009, the contents of both of which are incorporated herein by reference in their entireties.

FIG. 1 shows the electrochemical cell 100 and the evolved oxygen recovery system 200 in a discharge mode, connected to an external load 300. The regenerative electrochemical cell 100 of the illustrated single flow embodiment includes an oxygen reduction cathode 110, an electrolyte solution 120, an oxygen evolution anode 130 (also referred to as a charging anode), a metal fuel electrode 140, an electrolyte path 150, and a flow generator 160 for circulating the electrolyte solution 120. In the illustrated embodiment, the flow generator 160 is a pump. In such a single flow embodiment, the oxygen evolution anode 130 is disposed within the electrochemical cell 100 between the oxygen reduction cathode 110 and the metal fuel electrode 140, thereby allowing the electrochemical cell 100 to operate in discharge and recharge modes without needing to reverse the circulation of the electrolyte solution 120.

Electricity is generated through an oxidation/reduction reaction that occurs between the oxygen reduction cathode 110 and the metal fuel electrode 140. The oxygen reduction cathode 110 may be a passive or "breathing" cathode that passively accepts gasses it is exposed to. The oxygen reduction cathode 110 is generally gas permeable, but not liquid permeable, thereby allowing the intake of gasses such as oxygen, without releasing the electrolyte solution 120 from the electrochemical cell 100. The oxygen reduction cathode 110 may include a catalyst material, such as manganese oxide, nickel, silver, pyrolized cobalt, activated carbon, platinum, or any other catalyst material or mixture of materials with high oxygen reduction activity in the electrolyte for catalyzing reduction of an oxidizer.

During discharge, or electricity generating, mode, as depicted in the embodiment of FIG. 1, the metal fuel electrode 140 acts as an anode. In an embodiment, the metal fuel electrode 140 may contain a filter body (not shown) made of any formation able to capture and retain, through filtering, electrodepositing, or otherwise, particles or ions of metal fuel from the electrolyte solution 120. In addition, the filter body may be formed from a conductive material. Embodiments of such a filter body are discussed in greater detail in U.S. Provisional Patent Application No. 61/064,955, filed Apr. 4, 2008, and U.S. patent application Ser. No. 12/385,217, filed Apr. 1, 2009, the contents of both of which are incorporated herein by reference in their entireties. Electricity that can be drawn by the external load 300 is generated when an oxidizer at the oxygen reduction cathode 110 is reduced, while the metal fuel at the metal fuel electrode 140 is oxidized to an oxidized form. The external load 300 is electrically connected to both the oxygen reduction cathode 110 and the metal fuel electrode 140 to complete an electrical circuit. The electrical potential of the electrochemical cell 100 is depleted once the metal fuel at the metal fuel electrode 140 is entirely oxidized.

The electrolyte solution 120 can be circulated passively, such as through gravity, through motion of the device, or any other process that transports the oxidized metal fuel ions away from the metal fuel electrode 140 and through a gap towards the oxygen reduction cathode 110. This "transport flow" of the electrolyte solution 120, can also be accomplished in some embodiments with the flow generator 160. When the flow generator 160 is a pump, it may have any suitable construction or configuration, including but not limited to piezoelectric, centrifugal, gear, flexible impeller, peristaltic, or any other type of pump. Any other method of circulating the electrolyte solution 120 from the metal fuel electrode 140 towards the oxygen reduction cathode 110 during discharge mode may be used. The electrolyte solution 120 will then enter the electrolyte path 150, which has an entrance in the discharge direction of flow of the electrolyte solution 120 disposed between the electrolyte side of the oxygen reduction cathode 110 and the metal fuel electrode 140, where it directs the electrolyte solution 120 back to the metal fuel electrode 140. In some embodiments, the flow generator 160 may be disposed between the electrolyte path 150 and the metal fuel electrode 140, or within the electrolyte path 150.

While the illustrated embodiment is operating in discharge mode, as described above, the oxygen evolution anode 130 is inoperative and is configured to allow the electrolyte solution 120 to flow therethrough. The oxygen evolution anode 130, which can also be described as a charging electrode, is depicted as a separate electrode in the illustrated embodiment because generally most electrodes suitable for function as an oxygen reduction cathode do not perform well as an anode when being used for charging purposes. The electrochemical cell is not intended to be limited, however, and it is possible for the oxygen evolution anode 130 and the oxygen reduction cathode 110 to be the same electrode, with the flow of the electrolyte solution 120 modified accordingly. In embodiments where the oxygen evolution anode 130 is separate, it should be permeable to the electrolyte solution 120, thereby allowing for the flow of the electrolyte solution 120 from the metal fuel electrode 140 through the oxygen evolution anode 130, and to the oxygen reduction cathode 110.

In charging mode, as depicted in FIG. 2, a power supply 310 is connected to the metal fuel electrode 140, which becomes a cathode, and to the oxygen evolution anode 130, and the circuit to the external load 300 is intercepted. Details of the charging mode are provided in U.S. Provisional Patent Application No. 61/054,364, filed May 19, 2008, and U.S. patent application Ser. No. 12/385,489, filed on Apr. 9, 2009, the contents of both of which are incorporated herein by reference in their entireties. By supplying an electrical current across the metal fuel electrode 140 and the oxygen evolution anode 130, the metal fuel of the metal fuel electrode 140, which was converted from a metal to an oxidized form, including but not limited to spent metal fuel oxide, metal fuel hydroxide, and metal fuel hydroxide anions, during discharge mode, is reduced from the oxidized form back to the metal fuel. At the same time, the oxygen evolution anode 130 oxidizes hydroxide ions that are generated during the reduction of the oxidized metal fuel, and are present in the electrolyte solution 120. Oxidation of the hydroxide ions evolves oxygen, which flows within the electrolyte solution 120.

The evolved oxygen may be recycled by the evolved oxygen recovery system 200. The evolved oxygen recovery system 200 contains an oxygen separator 210 that is configured to separate evolved oxygen from the electrolyte solution 120. In the illustrated embodiments, the oxygen separator 210 is disposed within the electrolyte path 150. The oxygen separator 210 may alternatively be located anywhere within the electrochemical cell 100 that is in contact with the electrolyte solution 120. The oxygen separator 210 may be of any suitable construction or configuration, including but not limited to a reversed U-tube which may provide space for the evolved oxygen to bubble out of the electrolyte solution 120. The evolved oxygen recovery system 200 additionally has an oxygen recovery path 220, through which separated oxygen 230 is directed back to the air side of the oxygen reduction cathode 110 for use as an oxidizer during the discharge mode as discussed above. The oxygen recovery path 220 can be of any suitable construction or configuration. In an embodiment, the separated oxygen 230 is not released to the ambient air outside of the electrochemical cell 100 or the evolved oxygen recovery system 200, but is instead fully contained within the combination of the electrochemical cell 100 and the evolved oxygen recovery system 200.

In an embodiment, the evolved oxygen recovery system 200 may include a recovery flow generator 240, configured to generate a flow of the separated oxygen 230 within the oxygen recovery path 220. The recovery flow generator 240 can be of any suitable construction or configuration, including but not limited to a pump, a vacuum, a turbine, a fan, or any other suitable flow generating device. In an embodiment, the evolved oxygen recovery system 200 may include an accumulating vessel 250. The accumulating vessel 250 can be of any construction or configuration configured to provide space for the separated oxygen 230 to gather without releasing the separated oxygen 230 to the ambient air outside of the electrochemical cell 100 or the evolved oxygen recovery system 200. In an embodiment, the evolved oxygen recovery system 200 may have a flow regulator 260, configured to selectively limit the flow of the separated oxygen 230 within the oxygen recovery path 220 to the oxygen reduction cathode 110. The flow regulator 260 may have any suitable construction or configuration, including a valve, a pressure regulator, a gate, a clamp, or any other such device that can limit the flow of the separated oxygen 230. In an embodiment that contains both a flow regulator 260 and a recovery flow generator 240, there may be a controller (not shown) that can selectively control the operation of both the recovery flow generator 240 and the flow regulator 260. Such a controller may be used to prevent excessive buildups of oxygen within the evolved oxygen recovery system 200, such as between the flow regulator 260 and the oxygen separator 210.

Although the oxidizer that the oxygen reduction cathode 110 is initially exposed to will eventually become separated oxygen 260 that is evolved during operation of the electrochemical cell 100, the initial supply of oxidizer may come from oxygen that is sealed in the evolved oxygen recovery system 200 at the time of the manufacture or assembly of the system and electrochemical cell 100. The evolved oxygen recovery system 200 may also be assembled with an initial supply of pure oxygen, or any other gaseous mixture containing oxygen contained within it, for use by the cell, and ultimate separation by the oxygen separator 210. In an embodiment, air may be used during initial operation of the electrochemical cell 100 until enough oxygen is separated from the electrolyte solution 120 to support further operation of the electrochemical cell 100, or until the metal fuel is fully oxidized. Once enough oxygen has been accumulated, the external air may be shut off from the oxygen reduction cathode 110.

Figure 3:
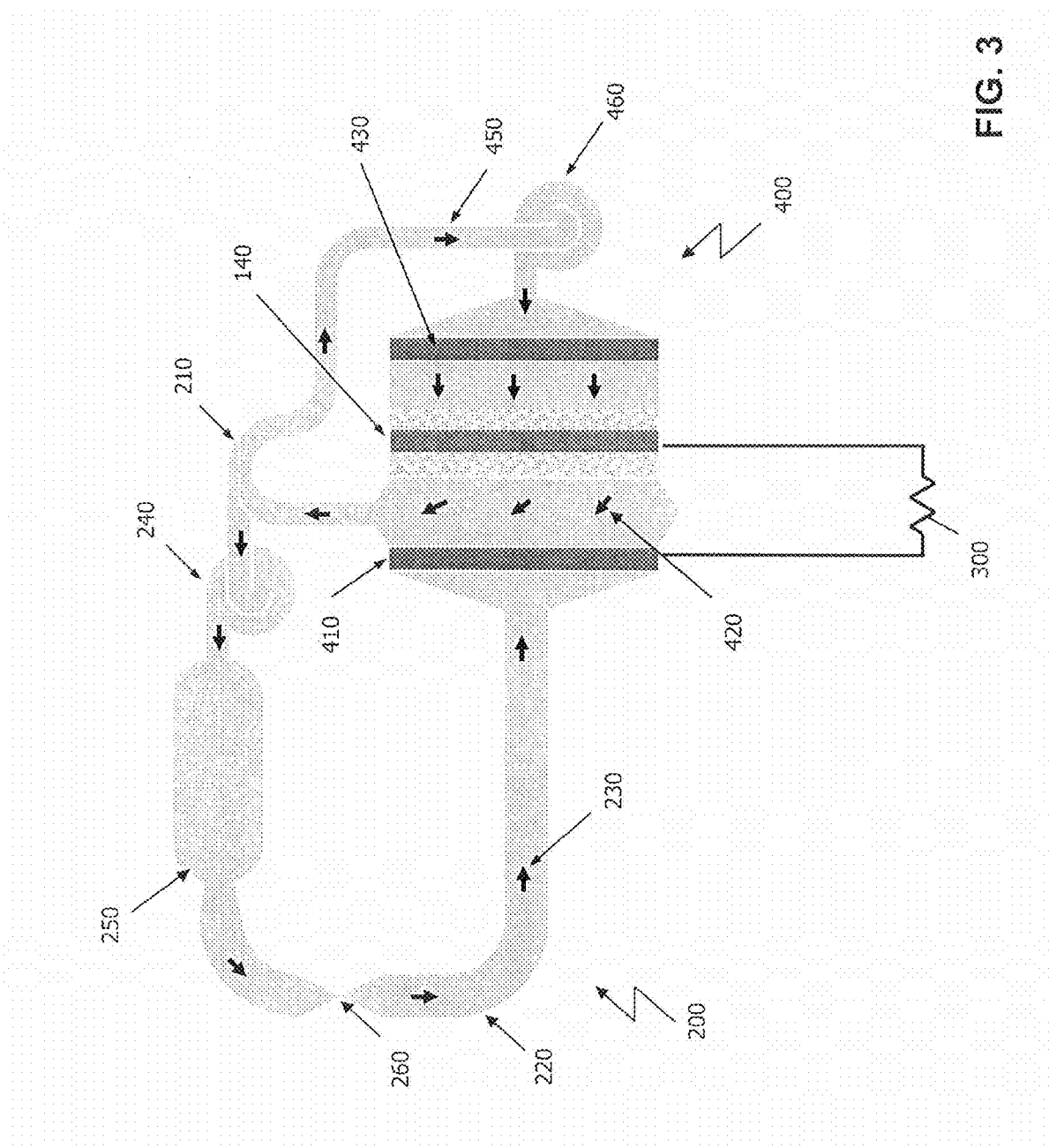
FIG. 3 is a schematic view of an embodiment of a regenerative electrochemical cell with an embodiment of an evolved oxygen recovery system, when the regenerative electrochemical cell is configured to discharge electricity.

FIG. 3 and FIG. 4 show schematic views of an embodiment of a reversible flow regenerative electrochemical cell 400 with an evolved oxygen recovery system 200. As illustrated, operation of the evolved oxygen recovery system is as described above for the electrochemical cell 100. In the reversible flow regenerative electrochemical cell 400, the metal fuel electrode 440 is disposed between the oxygen reduction cathode 410 and the oxygen evolution anode 430. Details of the embodiment of the regenerative electrochemical cell 400 are discussed in U.S. Provisional Patent Application No. 61/054,364, filed May 19, 2008 and U.S. patent application Ser. No. 12/385,489, filed on Apr. 9, 2009, the contents of both of which are incorporated herein by reference in their entireties. FIG. 3 shows the electrochemical cell 400 and the evolved oxygen recovery system 200 in a discharge mode, connected to an external load 300. The regenerative electrochemical cell 400 of the illustrated reversible flow embodiment includes an oxygen reduction cathode 410, an electrolyte solution 420, an oxygen evolution anode 430, a metal fuel electrode 440, an electrolyte path 450, and a reversible flow generator 460 for circulating the electrolyte solution 420. In the illustrated embodiment, the reversible flow generator 460 is a pump.

In such an embodiment, the metal fuel electrode 440 is disposed within the electrochemical cell 400 between the oxygen reduction cathode 410 and the oxygen evolution anode 430, thereby making a flow reversal desirable to allow the electrochemical cell 400 to operate in discharge and recharge modes. As illustrated in FIG. 3, the electrolyte solution 420 flows from the metal fuel electrode 440 to the oxygen reduction cathode 410 during discharge mode.

Generation of electricity occurs through an oxidation/reduction reaction occurring between the oxygen reduction cathode 410 and the metal fuel electrode 440. The oxygen reduction cathode 410 may be a passive or "breathing" cathode that passively accepts gasses it is exposed to. The oxygen reduction cathode 410 is generally gas permeable, but not liquid permeable, thereby allowing the intake of gasses such as oxygen, without releasing the electrolyte solution 420 from the electrochemical cell 400. The oxygen reduction cathode 410 may include a catalyst material, such as manganese oxide, nickel, silver, pyrolized cobalt, activated carbon, platinum, or any other catalyst material or mixture of materials with high oxygen reduction activity in the electrolyte for catalyzing reduction of an oxidizer.

During discharge mode, as depicted in the embodiment of FIG. 3, the metal fuel electrode 440 acts as an anode. In an embodiment, the metal fuel electrode 440 may contain a filter body (not shown) made of any formation able to capture and retain, through filtering, electrodepositing, or otherwise, particles of metal fuel from the electrolyte solution 420. Embodiments of such a filter body are discussed in greater detail in U.S. Provisional Patent Application No. 61/064,955, filed Apr. 4, 2008, and U.S. patent application Ser. No. 12/385,217, filed Apr. 1, 2009, the contents of both of which are incorporated herein by reference in their entireties. In addition, the filter body may be formed from a conductive material. Electricity that can be drawn by the external load 300 is generated when an oxidizer at the oxygen reduction cathode 410 is reduced, while the metal fuel at the metal fuel electrode 440 is oxidized to a metal oxidized form, as described above. The external load 300 is electrically connected to both the oxygen reduction cathode 410 and the metal fuel electrode 440 to complete an electrical circuit. The electrical potential of the electrochemical cell 400 is depleted once the metal fuel at the metal fuel electrode 440 is entirely oxidized.

The electrolyte solution 420 can be circulated passively, such as through gravity, through motion of the device, or any other process that transports the oxidized metal fuel ions away from the metal fuel electrode 440 and through a gap towards the oxygen reduction cathode 410. This "transport flow" of the electrolyte solution 420, can also be accomplished in some embodiments with the reversible flow generator 460. When the reversible flow generator 460 is a pump, it may have any suitable construction or configuration, including but not limited to piezoelectric, centrifugal, gear, flexible impeller, peristaltic, or any other type of pump. Any other method of circulating the electrolyte solution 420 from the metal fuel electrode 440 towards the oxygen reduction cathode 410 during discharge mode may be used. The electrolyte solution 420 will then enter the electrolyte path 450, which has an entrance in the discharge direction of flow of the electrolyte solution 420 disposed between the electrolyte side of the oxygen reduction cathode 410 and the metal fuel electrode 440, where it directs the electrolyte solution 420 back to the metal fuel electrode 440, passing through the oxygen evolution anode. In some embodiments, the reversible flow generator 460 may be disposed between the electrolyte path 450 and the metal fuel electrode 440, or within the electrolyte path 450.

While the illustrated embodiment is operating in discharge mode, as described above, the oxygen evolution anode 430 is inoperative. The oxygen evolution anode 430, which can also be described as a charging electrode, is depicted as a separate electrode in the illustrated embodiment because generally most electrodes suitable for function as an oxygen reduction cathode do not perform well as an anode when being used for charging purposes. The electrochemical cell is not intended to be limited, however, and it is possible for the oxygen evolution anode 430 and the oxygen reduction cathode 410 to be the same electrode, with the flow of the electrolyte solution 420 modified accordingly. In embodiments where the oxygen evolution anode 430 is separate, it should be permeable to the electrolyte solution 420, thereby allowing for the flow of the electrolyte solution 420 from the electrolyte path 450 to the metal fuel electrode 440 through the oxygen evolution anode 430.

As illustrated in FIG. 4, during recharge mode the electrolyte solution 420 must flow opposite to that of discharge mode, from the metal fuel electrode 440 to the oxygen evolution anode 430. The reversible flow generator 460 may be configured to switch the flow of the electrolyte solution 420 during operation of the reversible flow electrochemical cell 400, and may include a means for reversing the flow. Flow reversal can be achieved through any suitable construction, including but not limited to a controllable electrolyte gate system, or the use of multiple pumps facing opposite directions of flow, wherein only one is activated to achieve the desired flow direction.

In recharge mode, a power supply 310 is connected to the metal fuel electrode 440 and to the oxygen evolution anode 430, and the circuit to the external load 300 is intercepted. By supplying an electrical current across the metal fuel electrode 440 and the oxygen evolution anode 430, the metal fuel of the metal fuel electrode 440, which was converted from a metal to an oxidized fowl, including but not limited to spent metal fuel oxide, metal fuel hydroxide, and metal fuel hydroxide anions, during discharge mode, is reduced from the oxidized form back to the metal fuel. At the same time, the oxygen evolution anode 430 oxidizes hydroxide ions generated during the reduction of the oxidized metal fuel, and are present in the electrolyte solution 420. Oxidation of the hydroxide ions evolves oxygen, which travels within the electrolyte solution 420, before entering the evolved oxygen recovery system 200 as described above.

The foregoing illustrated embodiments have been provided solely for illustrating the structural and functional principles of the present invention are not intended to be limited. For example, the electrochemical cell in the present invention maybe practiced using different fuels, oxidizers, electrolytes, and or different overall structural configuration or materials. Thus, the present invention is intended to encompass all modifications, substitutions, alternations, and equivalents within the spirit and scope of the following appended claims.

What is claimed is:

1. An oxygen recovery system configured to recover evolved oxygen from a regenerative electrochemical cell, the regenerative electrochemical cell comprising (i) an oxygen reduction cathode, (ii) a fuel electrode comprising a fuel, the fuel electrode being configured to be a fuel anode for oxidizing the fuel when the electrochemical cell is operated to generate electricity and a cathode for reducing and electrode-positing the fuel thereon when the electrochemical cell is operated to regenerate the fuel, and (iii) an oxygen evolution anode that is configured to evolve oxygen from an electrolyte solution when the electrochemical cell is operated to regenerate the fuel, the oxygen recovery system comprising:

an oxygen separator located downstream of the oxygen evolution anode in a recharge direction of flow, the oxygen separator being configured to separate the evolved oxygen from the electrolyte solution; and an oxygen recovery path disposed between the oxygen separator and the oxygen reduction cathode, the oxygen recovery path being configured to direct the evolved oxygen separated from the electrolyte solution to the oxygen reduction cathode.

2. The oxygen recovery system of claim 1, further comprising a flow generator configured to generate a flow of the evolved oxygen in the oxygen recovery path.

3. The oxygen recovery system of claim 2, wherein the flow generator is a pump.

4. The oxygen recovery system of claim 1, further comprising a vessel configured to accumulate the evolved oxygen.

5. The oxygen recovery system of claim 1, further comprising a flow regulator configured to regulate the flow of the evolved oxygen.

6. The oxygen recovery system of claim 5, wherein the flow regulator is a valve.

7. The oxygen recovery system of claim 5, wherein the flow regulator is a pressure regulator.

8. The oxygen recovery system of claim 5, further comprising a flow generator configured to generate a flow of the evolved oxygen in the oxygen recovery path.

9. The oxygen recovery system of claim 8, further comprising a controller configured to control the flow regulator and the flow generator.

10. The oxygen recovery system of claim 1, wherein the oxygen recovery path is configured to direct the evolved oxygen to the oxygen reduction cathode without releasing any of the evolved oxygen to atmosphere.

11. A method for recovering evolved oxygen from a regenerative electrochemical cell, the regenerative electrochemical cell being configured to operate through oxidation of a metal fuel and reduction of an oxidizer, the cell comprising (i) an oxygen reduction cathode, (ii) a fuel electrode comprising a metal fuel, the fuel electrode being configured to be a fuel anode for oxidizing the metal fuel when the electrochemical cell is operating to generate electricity and a cathode for reducing and electrodepositing the metal fuel thereon when the electrochemical cell is operating to regenerate the fuel, and (iii) an oxygen evolution anode that is configured to evolve oxygen from an electrolyte solution when the electrochemical cell is operating to regenerate the fuel, the method comprising:

recharging the regenerative electrochemical cell by reducing and electrodepositing reducible oxidized metal fuel ions from the electrolyte solution as the metal fuel onto the fuel electrode functioning as a cathode and the evolving oxygen via oxidation at the oxygen evolution anode;

separating the evolved oxygen from the electrolyte solution with an oxygen separator; and directing the evolved oxygen from the oxygen separator into an oxygen recovery path disposed between the oxygen separator and the oxygen reduction cathode.

12. The method of claim 11, further comprising generating a flow of the evolved oxygen into the oxygen recovery path with a flow generator.

13. The method of claim 11, further comprising accumulating the evolved oxygen in a vessel.

14. The method of claim 11, further comprising regulating the flow of the evolved oxygen to the oxygen reduction cathode with a flow regulator.

15. The method of claim 12, further comprising regulating the flow of the evolved oxygen to the oxygen reduction cathode with a flow regulator, and controlling the flow regulator and the flow generator with a controller.

16. The method of claim 12, further comprising regulating the flow of the evolved oxygen to the oxygen reduction cathode with a flow regulator, accumulating the evolved oxygen in a vessel, and controlling the flow regulator and the flow generator with a controller.

17. The method of claim 11, wherein directing the evolved oxygen from the oxygen separator into an oxygen recovery path disposed between the oxygen separator and the oxygen reduction cathode prevents releasing any of the evolved oxygen to atmosphere.

18. An electrochemical cell system comprising:
a regenerative electrochemical cell comprising
an oxygen reduction cathode,
a fuel electrode comprising a fuel, the fuel electrode being configured to be a fuel anode for oxidizing the fuel when the electrochemical cell is operated to generate electricity and a cathode for reducing and electrodepositing the fuel thereon when the electrochemical cell is operated to regenerate the fuel, and
an oxygen evolution anode that is configured to evolve oxygen from an electrolyte solution when the electrochemical cell is operated to regenerate the fuel; and
an oxygen recovery system configured to recover evolved oxygen from the regenerative electrochemical cell, the oxygen recovery system comprising
an oxygen separator located downstream of the oxygen evolution anode in a recharge direction of flow, the oxygen separator being configured to separate the evolved oxygen from the electrolyte solution, and
an oxygen recovery path disposed between the oxygen separator and the oxygen reduction cathode, the oxygen recovery path being configured to direct the evolved oxygen separated from the electrolyte solution to the oxygen reduction cathode.

19. The electrochemical cell system of claim 18, further comprising a flow generator configured to generate a flow of the evolved oxygen in the oxygen recovery path.

20. The electrochemical cell system of claim 19, wherein the flow generator is a pump.

21. The electrochemical cell system of claim 18, further comprising a vessel configured to accumulate the evolved oxygen.

22. The electrochemical cell system of claim 18, further comprising a flow regulator configured to regulate the flow of the evolved oxygen.

23. The electrochemical cell system of claim 22, wherein the flow regulator is a valve.

24. The electrochemical cell system of claim 22, wherein the flow regulator is a pressure regulator.

25. The electrochemical cell system of claim 22, further comprising a flow generator configured to generate a flow of the evolved oxygen in the oxygen recovery path.

26. The electrochemical cell system of claim 25, further comprising a controller configured to control the flow regulator and the flow generator.

27. The electrochemical cell system of claim 18, wherein the oxygen recovery path is configured to direct the evolved oxygen to the oxygen reduction cathode without releasing any of the evolved oxygen to atmosphere.

* * * * *